(12) United States Patent
Andrieu et al.

(10) Patent No.: US 7,424,195 B2
(45) Date of Patent: Sep. 9, 2008

(54) MULTIMODE OPTICAL FIBRE

(75) Inventors: Xavier Andrieu, Bretigny-sur-Orge (FR); Lionel Provost, Southhampton (GB); Laurent Gasca, Villebon-sur-Yvette (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/561,442

(22) PCT Filed: Jun. 16, 2004

(86) PCT No.: PCT/FR2004/001522

§ 371 (c)(1),
(2), (4) Date: Oct. 29, 2007

(87) PCT Pub. No.: WO2005/003829

PCT Pub. Date: Jan. 13, 2005

(65) Prior Publication Data

US 2008/0118213 A1    May 22, 2008

(30) Foreign Application Priority Data

Jun. 24, 2003   (FR) .................................. 03 07590

(51) Int. Cl.
*G02B 6/02*     (2006.01)
*G02B 6/028*    (2006.01)
*G02B 6/036*    (2006.01)

(52) U.S. Cl. ..................... 385/126; 385/123; 385/124

(58) Field of Classification Search ................. 385/124, 385/126
See application file for complete search history.

(56) References Cited

U.S. PATENT DOCUMENTS

| 4,265,515 A | 5/1981 | Kao |
| 6,157,763 A | 12/2000 | Grubb et al. |
| 6,288,835 B1 | 9/2001 | Nilsson et al. |
| 2003/0174984 A1* | 9/2003 | Chiang et al. ............... 385/124 |

FOREIGN PATENT DOCUMENTS

EP    1 199 581 A1    4/2002

\* cited by examiner

*Primary Examiner*—Michelle R. Connelly-Cushwa
*Assistant Examiner*—Chris Chu
(74) *Attorney, Agent, or Firm*—Sughrue Mion, PLLC

(57) ABSTRACT

Optical fiber having a multimode core (10) comprising:—a first zone (11), which is homogeneous, made of a first material, which has a first refractive index;—a second zone (12) made of at least one second material, which has a second refractive index, which is less than the first index, that second zone (12) being peripherally arranged with respect to the first zone (11), said first and second zones being configured so that the interface between those zones defines, in a transverse plane, a contour which has a star shape such that the multimode transmission characteristics of the fiber are equivalent to those of a graded-index fiber. Application in dual-core amplifying fibers or lasers or in transmission fibers for local networks.

18 Claims, 5 Drawing Sheets

FIG_1
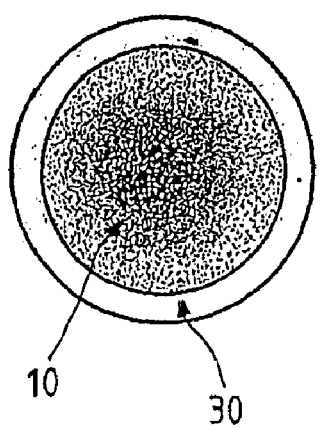
FIG_2
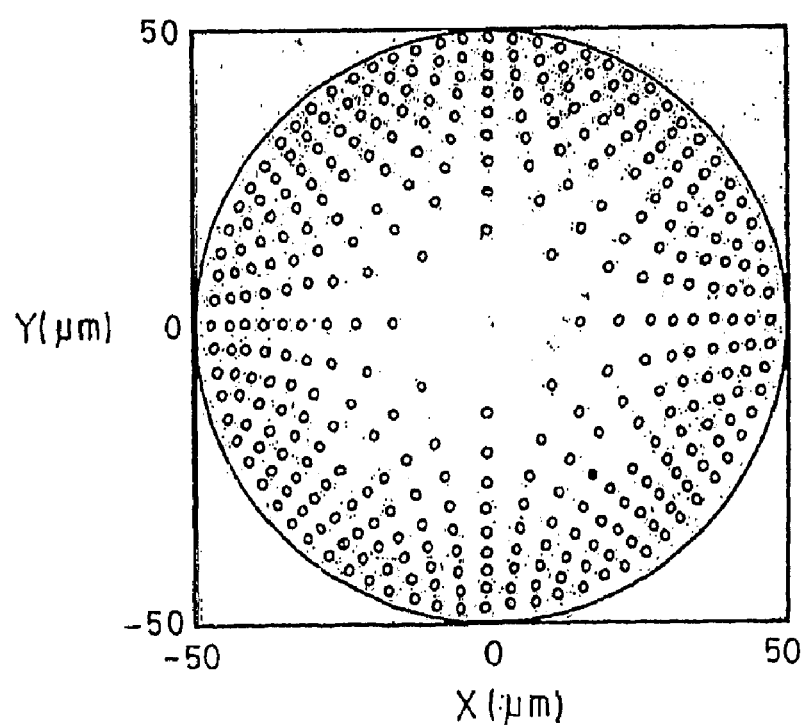

FIG_3
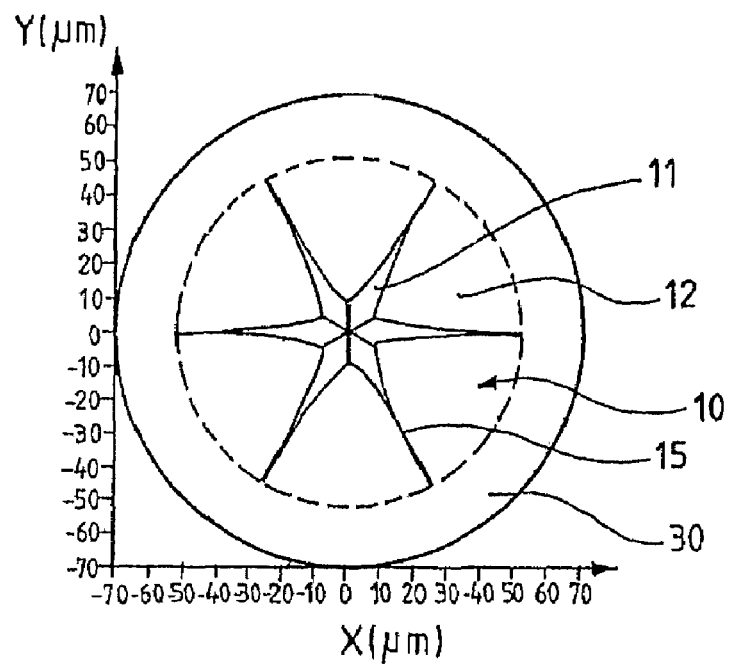
FIG_4
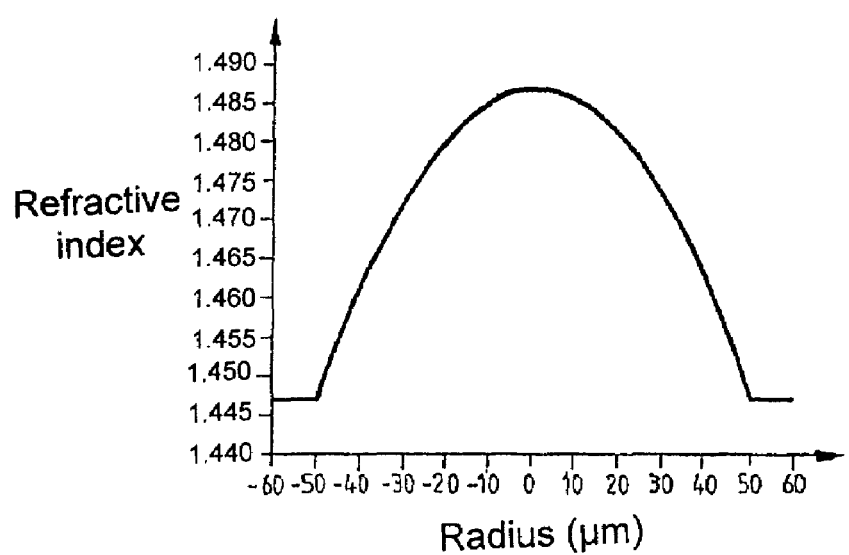

FIG_5
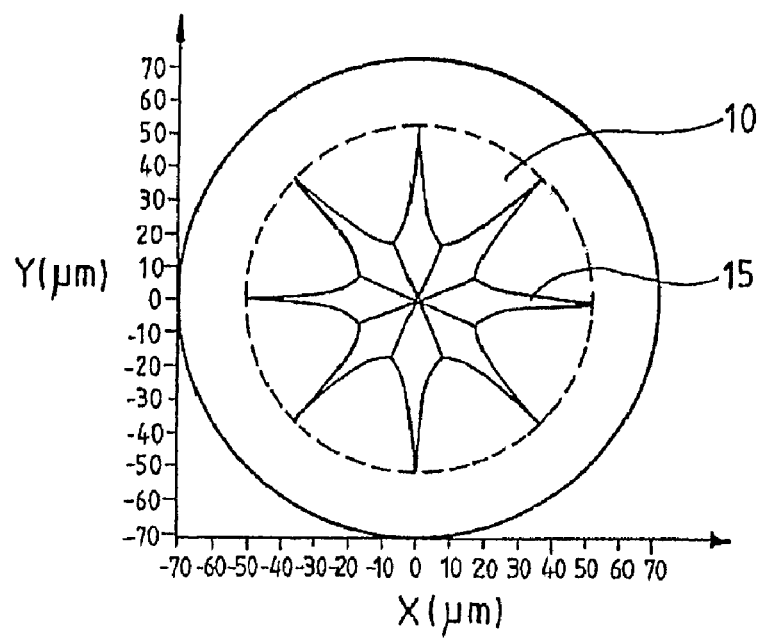
FIG_6
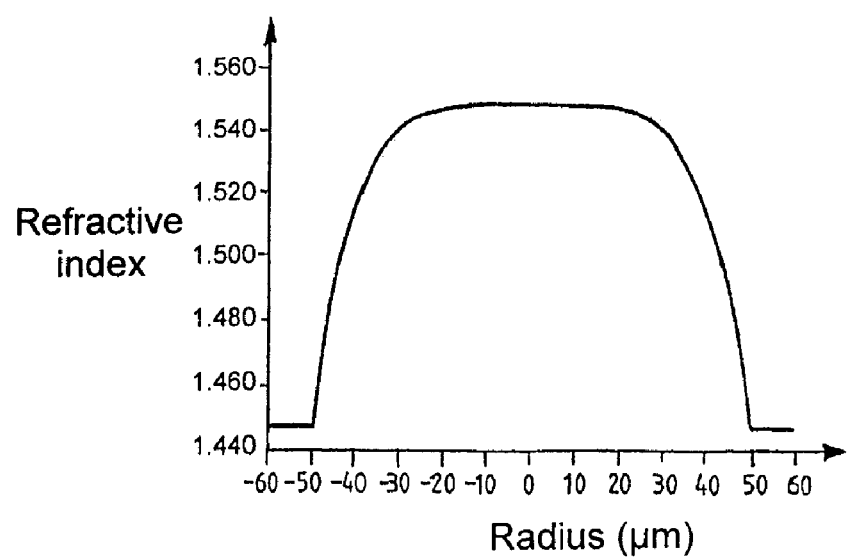

FIG_7
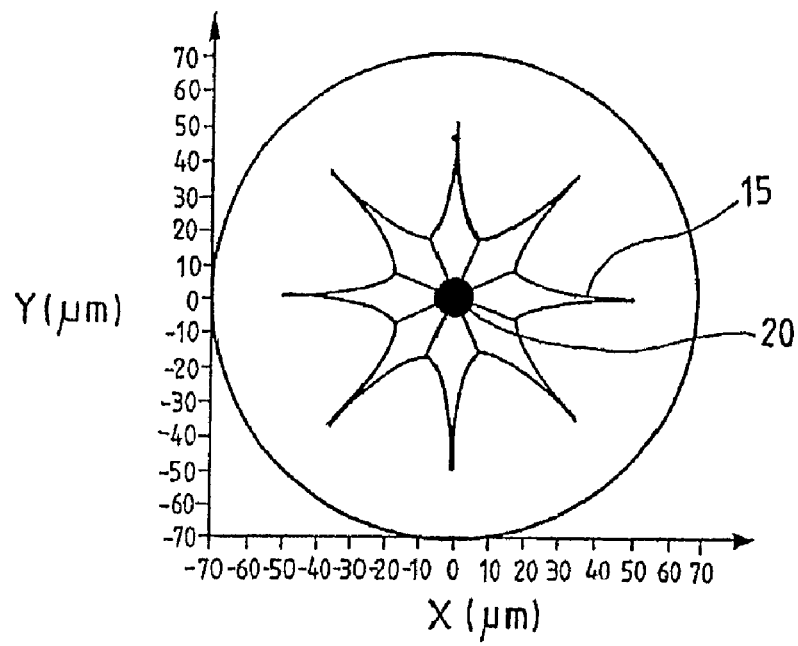
FIG_8
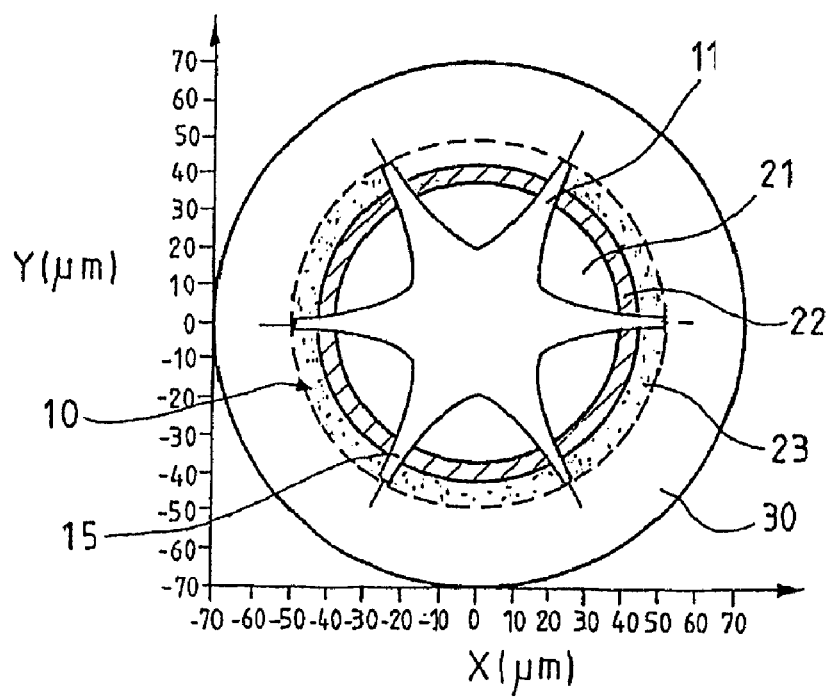

FIG_9
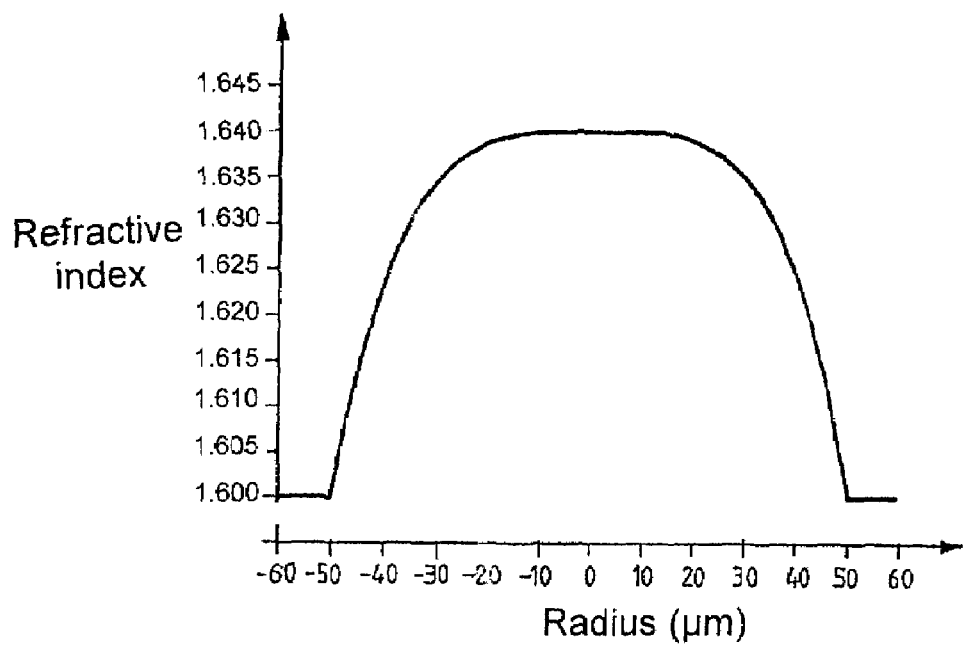
FIG_10
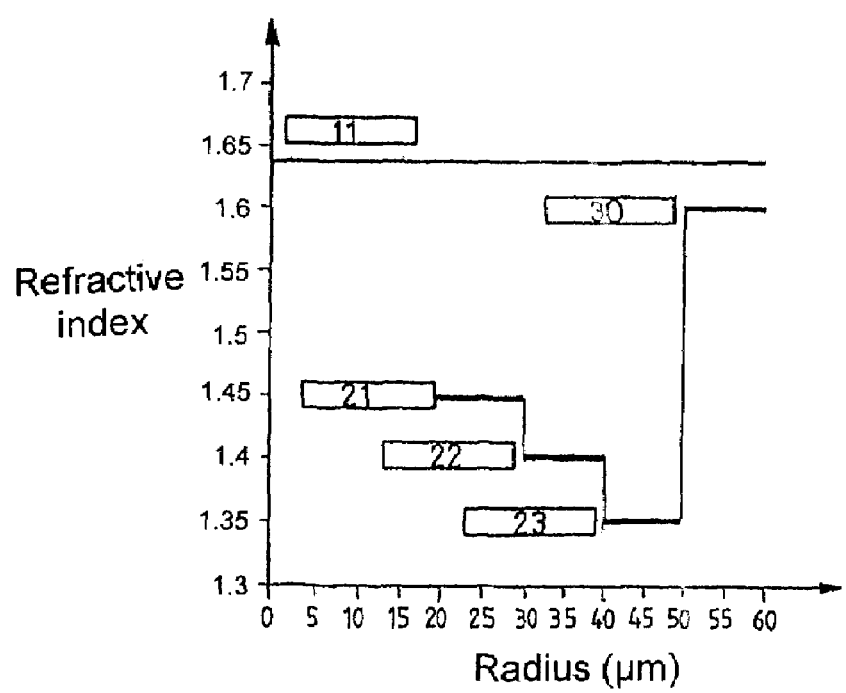

MULTIMODE OPTICAL FIBRE

BACKGROUND OF THE INVENTION

The present invention relates to a multimode optical fiber. Such fibers are used especially for short-distance optical transmission systems which require a wide bandwidth.

An optical fiber is conventionally composed of an optical core, which has the function of transmitting the light pulse of an optical signal, and an optical cladding, which has the function of confining the optical signal within the core. For that purpose the refractive indices of the core $n_1$ and of the cladding $n_2$ are such that $n_1 > n_2$.

Generally, in a fiber there are defined an axial direction (Y), which corresponds to the propagation direction of the optical signal in the fiber, a radial direction (r), which extends from the center of the core to the cladding of the fiber, and a transverse plane (X, Y), which corresponds to a section through the fiber perpendicular to its axial direction.

Multimode fibers are frequently used for short-distance applications and for local networks. A multimode core generally has a diameter of about 50 µm, as opposed to about 6 µm for a single-mode core. As a result, for a given wavelength, a plurality of optical modes propagate simultaneously along the fiber, carrying the same information.

The bandwidth is directly linked to the group delay of the optical modes propagating in the multimode core of the fiber. In order to ensure a wide bandwidth it is necessary for the group delays of all the modes to be the same, that is to say for the intermodal dispersion to be zero or at the very least minimised, for a given wavelength.

However, in a conventional stepped-index fiber, the various modes propagate at different velocities along the fiber, which causes spreading of the light pulse, which can approach the spacing between the pulses and give rise to an unacceptable error rate.

In order to decrease the intermodal dispersion in a multimode fiber, it has been proposed to produce graded-index fibers, an illustration of which is provided in FIG. 1. A graded-index fiber comprises a multimode core 10 having a radial index profile and a confinement cladding 30. Such a fiber is defined and its characteristics described in the publications "Multimode theory of graded-core fibres" by D. Gloge et al., Bell system Technical Journal 1973, pp 1563-1578, and "Comprehensive theory of dispersion in graded-index optical fibers" by G. Yabre, Journal of Lightwave Technology, February 2000, Vol. 18, No. 2, pp 166-177.

A graded-index profile can be defined by a relationship between the value n of the index at a point as a function of the distance r of that point from the center of the fiber:

$$n^2(r) = n_{max}^2 \{1 - 2\Delta(r/r_{max})^\alpha\}$$

wherein $\alpha \geq 1$ ($\alpha \to \infty$ corresponding to a step in the index);
$n_{max}$ is the maximum index of the multimode core;
$r_{max}$ is the radius of the multimode core;
$\Delta = (n_{max}^2 - n_{min}^2)/2n_{max}^2$; wherein $n_{min}$, the minimum index of the multimode core, generally corresponds to the index of the cladding.

To summarize, a graded-index fiber has an index profile in the multimode core which has symmetry of revolution and is such that along any radial direction the value of the index decreases continuously from the center of the fiber to its periphery.

When a multimode light signal propagates in a graded-index core of such a kind, the different modes "see" a different propagation medium, which differently affects their propagation velocity. By adjusting the value of the parameter α, it is accordingly possible to obtain a group velocity which is virtually equal for all the modes and, therefore, reduced intermodal dispersion.

Such a solution has two major disadvantages, however. Firstly, the index gradient is obtained by controlled doping of the multimode core, for example doping of the silica or plastics-material core with germanium, which calls for a complex and costly manufacturing process. Secondly, changes in the doping with ageing of the fiber can cause appreciable deterioration in intermodal dispersion, especially in the case of plastics-material optical fibers.

Also known, from the document EP 1 199 581, is an optical fiber having a microstructured multimode core, an illustration of which in a cross-sectional view is provided in FIG. 2. This optical fiber has an equivalent index gradient introduced into the multimode core by elements axially oriented along the length of the fiber. These elements, for example air holes, are provided circumferentially around the center of the multimode core. A microstructured fiber of such a kind is, however, complicated to manufacture.

In addition, multimode fibers also have applications as dual-core fibers for optical amplifiers or lasers. A single-mode central core in that case allows an optical signal to be transmitted and a multimode core allows a pump signal to be injected. A doped region, for example doped with rare earth elements, is arranged within the single-mode core or as a ring in a region surrounding said core, as is known from the document U.S. Pat. No. 6,288,835. The optical signal of the single-mode core is amplified by interaction with the pump signal passing through the doped region. The efficiency of amplification depends directly on the overlap between the pump signal and the single-mode signal. Therefore, the multimode pump signal has to be made to pass through the single-mode core as often as possible along the doped fiber.

SUMMARY OF THE INVENTION

For that purpose it has earlier been proposed, especially in the documents U.S. Pat. No. 5,949,941 and WO 02/03510, to introduce radial protuberances on the outer surface of the doped region or to provide that surface with a polygonal shape in cross-section. Those solutions allow better overlap of the pump signal with the doped region.

The aim of the present invention is to propose a multimode optical fiber having multimode transmission characteristics that are equivalent to those of a graded-index fiber but without the need to produce an index gradient of such a kind.

The invention relates more especially to an optical fiber having a multimode core comprising:
a first zone, which is homogeneous, made of a first material, which has a first refractive index;
a second zone made of at least one second material, which has a second refractive index, which is less than the first index, that second zone being peripherally arranged with respect to the first zone, said first and second zones being configured so that the interface between those zones defines, in a transverse plane, a contour delimiting the first zone which has a star shape such that the multimode transmission characteristics of the fiber are equivalent to those of a graded-index fiber.

In accordance with a characteristic, the star shape of said contour has N arms and has rotational symmetry of order N.

In accordance with a characteristic, the star shape of said contour has at least 4 arms.

In accordance with an embodiment, the second zone comprises a plurality of materials having different refractive indices.

In accordance with a characteristic, the different materials of the second zone are concentric.

In accordance with a characteristic, the fiber comprises, in addition, a cladding made of a material of the second zone of the multimode core.

In accordance with an embodiment, the material of the first zone of the multimode core comprises glass.

In accordance with another embodiment, the material of the first zone of the multimode core comprises plastics material.

In accordance with an embodiment, the material of the second zone of the multimode core comprises plastics material.

In accordance with another embodiment, the material of the second zone of the multimode core comprises glass.

In accordance with a characteristic, the glass comprises silica.

In accordance with an embodiment, the material of the first and/or second zone of the multimode core comprises a dopant element.

In accordance with a characteristic, the fiber comprises, in addition, a single-mode core and the first zone is located peripherally with respect to that single-mode core.

In accordance with a characteristic, the single-mode core comprises a rare-earth dopant.

In accordance with a characteristic, the single-mode core is surrounded by a ring comprising a rare-earth dopant.

The invention relates also to an optical amplifier or a laser which includes an optical fiber according to the invention.

The invention relates also to a local optical network which includes at least one optical fiber according to the invention.

BRIEF DESCRIPTION OF THE DRAWINGS

The particularities and advantages of the invention will be better understood on reading the description that follows, given by way of illustrative and non-limiting example and referring to the accompanying Figures wherein:

FIG. 1, which has already been described, is a cross-sectional view, in diagrammatic form, of a graded-index optical fiber in accordance with the prior art;

FIG. 2, which has already been described, is a cross-sectional view, in diagrammatic form, of a microstructured fiber having an equivalent index gradient in accordance with the prior art;

FIG. 3 is a cross-sectional view, in diagrammatic form, of a fiber in accordance with a first embodiment of the invention;

FIG. 4 shows a graph of the equivalent refractive index of the fiber of FIG. 3;

FIG. 5 is a cross-sectional view, in diagrammatic form, of a fiber according to a second embodiment of the invention;

FIG. 6 shows a graph of the equivalent refractive index of the fiber of FIG. 5;

FIG. 7 is a cross-sectional view, in diagrammatic form, of a fiber according to the second embodiment in an amplifying fiber application;

FIG. 8 is a cross-sectional view, in diagrammatic form, of a fiber according to a third embodiment of the invention;

FIG. 9 shows a graph of the equivalent refractive index of the fiber of FIG. 8;

FIG. 10 shows a graph of the refractive index in the transverse plane of the fiber of FIG. 8.

DETAILED DESCRIPTION OF THE INVENTION

In accordance with the invention there is provided a multimode optical fiber that is equivalent to a fiber having an index profile with an index gradient. Such a fiber can accordingly have applications in high bit rate transmission over a short distance with an improved bandwidth, or applications in in-line amplification by dual-core fiber with an improved level of overlap.

The multimode core of the fiber according to the invention comprises two zones, each comprising a different material to the other. The interface between those two zones defines, in the transverse plane, a contour which has a star shape in the transverse plane of the fiber. This two-zone structure of the multimode core makes the fiber equivalent to a graded-index fiber.

A first embodiment of the fiber according to the invention is described with reference to FIG. 3, which is a cross-sectional view, in diagrammatic form, of the fiber.

The multimode core 10 (delimited by the broken line) has a first zone 11 comprising a first material having a refractive index $n_1$ and a second zone 12 comprising a second material having a refractive index $n_2<n_1$. Behaviour that is equivalent to a graded-index fiber is obtained by a shape of the interface 15 between said zones 11, 12 which is such that the contour defined by that interface in a transverse plane has a star shape. The interface 15 between the materials of said zones 11, 12 produces a step in the index.

The equivalent index gradient obtained is shown in the graph of FIG. 4.

The materials of those two zones can be different in nature or can have appropriate doping which causes the step in the index at the interface 15. The materials of the zones 11 and 12 are, however, homogeneous, the doping—where present—being uniform within said material. Manufacture of such a fiber is accordingly simplified compared to the control which is necessary when an index gradient has to be introduced by means of direct doping within a single material.

The materials of zones 11 and 12 of the multimode core can be made of glass and/or plastics material, which are optionally doped.

In accordance with an embodiment, the material of the first zone 11 can be a plastics material, such as polymethylmethacrylate (known under the designation Plexiglas®) and the material of the second zone 12 can be a plastics material, for example polymethylmethacrylate doped with a fluorinated compound. The interface 15 having a star-shaped contour can be obtained by extrusion of the polymers.

In accordance with another embodiment, the material of the first zone 11 can be a glass, for example silica, optionally doped with germanium, aluminum, phosphorus or lanthanum, which increases the refractive index. The material of the second zone 12 can be a plastics material, such as amorphous Teflon® for example, deposited on a glass preform of the first zone 11 during or after drawing-out of the fiber.

In accordance with another embodiment, the materials of the first 11 and second 12 zones can both be of glass, for example of silica, differently doped so as to provide the step in the index at the interface 15. The first zone 11 can be of silica doped with germanium, for example, or any other dopant raising the afore-mentioned refractive index; and the second zone 12 can be of silica doped with fluorine or boron so as to reduce the refractive index or it can comprise a silicate glass or a fluorinated glass. The star shape can be obtained by glassmaker's assembly. The difference in viscosity between the zones 11, 12 makes it possible to create a deformation on drawing-out of the preform and to create the star shape of the interface 15.

In FIG. 3, the star-shaped contour of the interface 15 has 6 arms. The equivalent index gradient is determined from the value of the indices $n_1$ and $n_2$ of the materials of, respectively, the first and second zones and from the length and thickness of the arms of the star shape of the interface.

The method by which the equivalent index is calculated is principally based on the publications of Rastogi et al., "Propagation characteristics of a segmented cladding fiber", Optics letters, Vol. 26, No. 8, pp. 491-493, and of Chiang, "Radial effective-index method for the analysis of optical fibers", Applied Optics, Vol. 26, No. 15, pp. 2969-2973.

This method makes it possible to define the mode characteristics, namely the electric field E and the effective index $n_{\mathit{eff}}$, in a periodic azimuthal index profile of angular period $\theta_m = 2\pi/N$, where N is the number of arms. Based on the hypothesis that the electric field of a mode $E(r,\theta)$ can be broken down into a radial component $E_r$ and an azimuthal component $E_{r\theta}$, such that $(E(r,\theta)=E_r(r)\cdot E_{r\theta}(r,\theta)$, obtaining the propagation constant of the mode is based on calculation of an equivalent index profile $n_{eq}$ having circular symmetry. This index profile $n_{eq}$ is obtained by an azimuthal distribution of the refractive indices at a given radius.

Accordingly, by appropriately selecting the azimuthal distribution of the refractive indices, that is to say the number and thickness of the arms and also the values of the refractive indices of the materials used, it is possible to produce the equivalent of an index gradient for the optical modes propagating in such a medium.

In the example of FIG. 3, the diameter of the multimode core is 50 μm, the difference in index Δn is $4\times10^{-2}$ and the value of α is 2. There is then obtained, as shown in FIG. 4, an index profile having a gradient from the center of the multimode core to the cladding 30 of the fiber.

In this example, as illustrated in FIG. 3, the cladding 30 of the fiber is made of the same material as that used for the second zone 12 of the multimode core 10. This clearly simplifies manufacture of the fiber. In this example, the cladding 30 has a thickness of 20 μm.

In the example of FIG. 5, the star-shaped interface 15 has 8 arms. The diameter of the multimode core 10 is 50 μm, the difference in index Δn is $1\times10^{-1}$ and the value of α is 5. There is then obtained, as shown in FIG. 6, an index profile having a gradient from the center of the multimode core to the cladding of the fiber.

In embodiments, the star shape of the interface 15 has an appropriate number of arms N, at least 4, preferably uniformly distributed azimuthally, that is to say the arms are distributed so that the angle formed between two consecutive arms is the same whichever arm is being considered. The contour of the interface 15 accordingly has rotational symmetry of order N.

In the example of FIG. 7, the star-shaped interface 15 has 8 arms and the multimode core corresponds to that of FIG. 5. The fiber comprises, in addition, a central single-mode core 20 capable of transmitting a single-mode optical signal. This single-mode core can include an amplifying medium, by being, for example, doped with a rare-earth element, such as erbium (Er). The single-mode core can also be surrounded by a ring comprising the amplifying medium, as is known from the document U.S. Pat. No. 6,288,835 mentioned hereinbefore.

The multimode core according to the invention is then used to transmit a pump wave over a certain distance of fiber. The graded-index structure of the multimode core allows a better overlap of the pump wave with the amplifying medium by increasing the power transferred to higher-order propagation modes, the lower-order modes being liable to be greatly attenuated along the fiber by a known phenomenon of mode coupling. Consequently, the better overlap of the multimode pump wave with the amplifying medium and the single-mode core brings about greater efficiency of amplification of the single-mode signal.

In the example of FIG. 8, the star-shaped interface 15 has 6 arms. The diameter of the multimode core 10 is 50 μm, the difference in index Δn is $4\times10^{-2}$ and the value of α is 4. There is then obtained, as shown in FIG. 9, an index profile having a gradient from the center of the multimode core to the cladding 30 of the fiber.

In this example, the second zone 12 of the multimode core is made of a plurality of concentric materials 21 (blank), 22 (hatched), 23 (dotted) having different, decreasing refractive indices, which are shown in FIG. 10.

Returning to the method for calculating the equivalent index, described hereinbefore, there is accordingly obtained an azimuthal distribution of the refractive indices for a given radius which is modified with respect to the example of FIG. 3 as a result of the presence of different refractive indices within the second zone 12. This embodiment accordingly makes it possible to produce a first, star-shaped zone 11 having thicker arms than in the example of FIG. 3, which is simpler to manufacture.

Such a fiber can be made of low-doped glass for the material of the first zone 11 and of three extruded polymers for the materials 21, 22, 23 of the second zone 12. The cladding 13 of the fiber can be of glass. The plastics materials of zone 12 can be polymethylmethacrylate, polycarbonate, Teflon® AF, an acrylate resin, optionally doped with fluorine to lower its refractive index, Cytop™ marketed, for example, by the company Asahi Glass.

A person skilled in the art will be able to determine, for the multimode core of an optical fiber, an equivalent index profile which is suitable for the desired application by selecting the refractive indices of the materials of the zones 11, 12 and the shape of the interface 15, that is to say the number and thickness of the arms to be formed.

The invention claimed is:

1. Optical fiber having a multimode core (10) comprising:
   a first zone (11), which is homogeneous, made of a first material, which has a first refractive index ($n_1$);
   a second zone (12) made of at least one second material, which has a second refractive index ($n_2$), which is less than the first index ($n_1$), that second zone (12) being peripherally arranged with respect to the first zone (11), said first and second zones being configured so that the interface between those zones defines, in a transverse plane, a contour delimiting the first zone (11) which has a star shape such that the multimode transmission characteristics of the fiber are equivalent to those of a graded-index fiber.

2. Optical fiber according to claim 1, wherein the star shape of said contour has N arms and has rotational symmetry of order N.

3. Optical fiber according to claim 1, wherein the star shape of said contour has at least 4 arms.

4. Optical fiber according to claim 1, wherein the second zone (12) comprises a plurality of materials (21, 22, 23) having different refractive indices.

5. Optical fiber according to claim 4, wherein the different materials of the second zone (12) are concentric.

6. Optical fiber according to claim 1, wherein it comprises, in addition, a cladding (30) made of a material of the second zone (12) of the multimode core.

7. Optical fiber according to claim 1, wherein the material of the first zone (11) of the multimode core comprises glass.

8. Optical fiber according to claim 7, wherein the glass comprises silica.

9. Optical fiber according to claim 1, wherein the material of the first zone (11) of the multimode core comprises plastics material.

10. Optical fiber according to claim 1, wherein the material of the second zone (12) of the multimode core comprises plastics material.

11. Optical fiber according to claim 1, wherein the material of the second zone (12) of the multimode core comprises glass.

12. Optical fiber according to claim 1, wherein the material of the first and/or second zone (11, 12) of the multimode core comprises a dopant element.

13. Optical fiber according to claim 1, wherein it comprises, in addition, a single-mode core (20), and in that said first zone (11) is located peripherally with respect to that single-mode core (20).

14. Optical fiber according to claim 13, wherein the single-mode core comprises a rare-earth dopant.

15. Optical fiber according to claim 13, wherein the single-mode core is surrounded by a ring comprising a rare-earth dopant.

16. Optical amplifier which includes an optical fiber according to claim 13.

17. Laser which includes a portion of optical fiber according to claim 13.

18. Local optical network which includes at least one optical fiber according to claim 1.

* * * * *